(12) United States Patent
Choi et al.

(10) Patent No.: US 12,549,965 B2
(45) Date of Patent: Feb. 10, 2026

(54) ELECTRONIC DEVICE AND METHOD FOR GENERATING REPRESENTATIVE DATA FOR TRAINING BASE STATION MODEL

(71) Applicant: SAMSUNG ELECTRONICS CO., LTD., Suwon-si (KR)

(72) Inventors: Minsuk Choi, Suwon-si (KR); Seowoo Jang, Suwon-si (KR); Juhwan Song, Suwon-si (KR); Seungyeon Lee, Suwon-si (KR); Jongwoo Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 366 days.

(21) Appl. No.: 18/143,337

(22) Filed: May 4, 2023

(65) Prior Publication Data
US 2023/0362680 A1 Nov. 9, 2023

Related U.S. Application Data

(63) Continuation of application No. PCT/KR2023/006031, filed on May 3, 2023.

(30) Foreign Application Priority Data

May 4, 2022 (KR) .......... 10-2022-0055727
Oct. 17, 2022 (KR) .......... 10-2022-0133615

(51) Int. Cl.
*H04W 24/02* (2009.01)
(52) U.S. Cl.
CPC .................. *H04W 24/02* (2013.01)
(58) Field of Classification Search
CPC ... H04W 24/02; H04W 52/42; H04W 52/143; H04W 52/322
See application file for complete search history.

(56) References Cited

U.S. PATENT DOCUMENTS 8,682,812 B1 3/2014 Ranjan
8,862,074 B2 10/2014 Hamalainen
(Continued)

FOREIGN PATENT DOCUMENTS

CN 101141765 A 3/2008
CN 114189888 A 3/2022
(Continued)

OTHER PUBLICATIONS

International Search Report and Written Opinion dated Jul. 26, 2023, issued by the International Searching Authority in International Application No. PCT/KR2023/006031 (PCT/ISA/220, PCT/ISA/210, and PCT/ISA/237).

(Continued)

*Primary Examiner* — Sam Bhattacharya
(74) *Attorney, Agent, or Firm* — Sughrue Mion, PLLC

(57) ABSTRACT

An electronic device includes a memory storing instructions, a transceiver configured to receive base station data, and at least one processor configured to execute the instructions to: divide the base station data into a plurality of pieces of base station data according to a first time unit; generate first data of the first time unit by superimposing the plurality of pieces of base station data on each other; divide the first data of the first time unit into a plurality of second time intervals, according to a second time interval unit; calculate at least one probability density function for each second time interval of the plurality of second time intervals; generate at least one first representative data by using respective probability density functions of the plurality of second time intervals; and train the base station model, based on the at least one first representative data.

20 Claims, 9 Drawing Sheets

(56) References Cited

U.S. PATENT DOCUMENTS

| | | |
|---|---|---|
| 9,439,081 B1 | 9/2016 | Knebl et al. |
| 11,296,936 B2 | 4/2022 | Johnson et al. |
| 11,696,153 B2 | 7/2023 | Chen et al. |
| 2015/0045008 A1 | 2/2015 | Karla |
| 2016/0212633 A1 | 7/2016 | Flanagan et al. |
| 2020/0196155 A1 | 6/2020 | Bogineni et al. |
| 2021/0097409 A1 | 4/2021 | Reynolds |
| 2021/0174264 A1 | 6/2021 | Jordan et al. |
| 2021/0241141 A1 | 8/2021 | Dugger et al. |
| 2021/0250230 A1 | 8/2021 | Johnson et al. |
| 2021/0344582 A1 | 11/2021 | Samadi |
| 2021/0357722 A1 | 11/2021 | Jang et al. |
| 2021/0377844 A1* | 12/2021 | Tseng ............ H04W 72/0453 |
| 2022/0131764 A1 | 4/2022 | Lee et al. |
| 2022/0361011 A1 | 11/2022 | Uusitalo et al. |
| 2023/0032030 A1 | 2/2023 | Choi et al. |

FOREIGN PATENT DOCUMENTS

| | | |
|---|---|---|
| JP | 2019-97001 A | 6/2019 |
| JP | 2021-78076 A | 5/2021 |
| KR | 10-2021-0094368 A | 7/2021 |
| KR | 10-2021-0141323 A | 11/2021 |
| KR | 10-2340258 B1 | 12/2021 |
| KR | 10-2022-0055363 A | 5/2022 |
| KR | 10-2023-0017712 A | 2/2023 |
| WO | 2021/018370 A1 | 2/2021 |
| WO | 2021/191754 A1 | 9/2021 |
| WO | 2022/008954 A1 | 1/2022 |
| WO | 2022/018304 A1 | 1/2022 |
| WO | 2022/104324 A1 | 5/2022 |

OTHER PUBLICATIONS

International Search Report and Written Opinion dated Jul. 28, 2023, issued by the International Searching Authority in International Application No. PCT/KR2023/006035 (PCT/ISA/220, PCT/ISA/210, and PCT/ISA/237).

Communication dated Apr. 2, 2025, issued by the European Patent Office in European Application No. 23799673.1.

Minsuk Choi et al., "Scenario Compaction and Ensemble with RAN Digital Twin for Efficient and Robust Learning", IEEE Global Communications Conference (GLOBECOM), Dec. 2022, 6 Pages.

Minsuk Choi et al., "Temporally Efficient Learning using Data Compaction for Bespoke Cell On/Off Parameter Optimization", IEEE Global Communications Conference (GLOBECOM), Dec. 2022, 5 Pages.

Communication dated Feb. 14, 2025, issued by the European Patent Office in European Application No. 23799676.4.

Fernandes Gilberto Jr et al: "A comprehensive survey on network anomaly detection", Baltzer Science Publishers, vol. 70, No. 3, Jul. 2, 2018, pp. 447-489, XP036705363.

Lu Yao et al: "A GRU-based Prediction Framework for Intelligent Resource Management at Cloud Data Centres in the age of 5G", IEEE Transactions on Cognitive Communications and Networking, vol. 6, No. 2, Nov. 19, 2019, pp. 486-498, XP011792488.

* cited by examiner

ELECTRONIC DEVICE AND METHOD FOR GENERATING REPRESENTATIVE DATA FOR TRAINING BASE STATION MODEL

CROSS-REFERENCE TO RELATED APPLICATIONS

This application is a continuation application of International Application No. PCT/KR2023/006031, filed on May 3, 2023, which claims priority to Korean Patent Application No. 10-2022-0055727, filed on May 4, 2022, and to Korean Patent Application No. 10-2022-0133615, filed on Oct. 17, 2022, in the Korean Intellectual Property Office, the disclosures of which are incorporated by reference herein in their entireties.

BACKGROUND

1. Field

The disclosure relates to communication systems, and more particularly, to a device for generating representative data for training a base station model, and a method, performed by the device, of generating representative data.

2. Description of Related Art

A network digital twin is a technique that may be used to predict an operating environment of an actual base station by using a simulator to replicate an operation and/or a configuration state of the actual base station. For example, when a new wireless communication algorithm is developed, the performance of the developed algorithm may be evaluated in a particular simulator environment such that an operating environment of an actual base station may not be applied. In addition, a base station operation optimization model of a network digital twin may collect base station data and train a base station model with reinforcement learning by using the collected base station data as an input.

A process of training a base station model with reinforcement learning may include generating a network digital twin by collecting base station data, preprocessing the collected base station data, finding simulation parameters by using the preprocessed data, and training a base station operation optimization model by setting arbitrary parameters in the network digital twin. In this case, a large amount of data may be used for preprocessing the collected base station data and finding the simulation parameters, and thus, a large amount of computational resources may be consumed.

SUMMARY

According to an aspect of the present disclosure, an electronic device for generating representative data for training a base station model is provided. The electronic device includes a memory storing one or more instructions, a transceiver configured to receive base station data, and at least one processor. The at least one processor is configured to execute the one or more instructions stored in the memory to divide the base station data into a plurality of pieces of base station data according to a first time unit. The at least one processor is configured to execute the one or more instructions stored in the memory to generate first data of the first time unit by superimposing the plurality of pieces of base station data on each other. The at least one processor is configured to execute the one or more instructions stored in the memory to divide the first data of the first time unit into a plurality of second time intervals, according to a second time interval unit. The at least one processor is configured to execute the one or more instructions stored in the memory to calculate at least one probability density function for each second time interval of the plurality of second time intervals. The at least one processor is configured to execute the one or more instructions stored in the memory to generate at least one first representative data by using respective probability density functions of the plurality of second time intervals. The at least one processor is configured to execute the one or more instructions stored in the memory to train the base station model, based on the at least one first representative data.

According to an aspect of the present disclosure, a method of generating representative data for training a base station model is provided. The method includes dividing base station data into a plurality of pieces of base station data according to a first time unit. The method further includes generating first data of the first time unit by superimposing the plurality of pieces of base station data on each other. The method further includes dividing the first data of the first time unit into a plurality of second time intervals, according to a second time interval unit. The method further includes calculating at least one probability density function for each second time interval of the plurality of second time intervals. The method further includes generating at least one first representative data by using respective probability density functions of the plurality of second time intervals. The method further includes training the base station model, based on the at least one first representative data.

According to an aspect of the present disclosure, a computer-readable medium may include one or more pieces of program code. When executed by an electronic device, the one or more pieces of program code may execute a method including dividing base station data into a plurality of pieces of base station data according to a preset first time unit, generating first data of the first time unit by superimposing the plurality of pieces of base station data on each other, calculating at least one probability density function for each preset second time interval by dividing the superimposed first data according to the second time interval unit, generating at least one piece of first representative data by using the probability density function for each second time interval, and training the base station model, based on the generated at least one piece of first representative data. The recording medium disclosed as a technical unit for achieving the above-described technical object may store a program for executing at least one of the methods according to embodiments of the present disclosure.

Additional aspects will be set forth in part in the description which follows and, in part, will be apparent from the description, or may be learned by practice of the presented embodiments.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
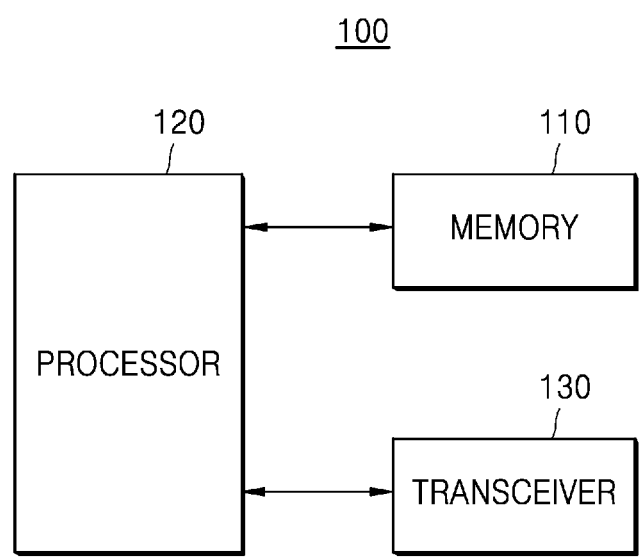
FIG. 1 is a block diagram illustrating a configuration of an electronic device, according to an embodiment.

The following description of embodiments of the present disclosure is described in detail with reference to the accompanying drawings for those of skill in the art to be able to perform the present disclosure without any difficulty. The present disclosure may, however, be embodied in many different forms and should not be construed as being limited to the embodiments of the present disclosure set forth herein. In addition, in order to clearly describe the present disclosure, portions that are not relevant to the description of the present disclosure may be omitted, and similar reference numerals may be assigned to similar elements throughout the present disclosure.

Although the terms used in the present disclosure may be selected from among common terms that may be currently widely used in consideration of their function in the present disclosure, the terms may be different according to an intention of those of ordinary skill in the art, a precedent, and/or the advent of new technology. Also, in particular cases, the terms may be discretionally selected by the applicant of the present disclosure, in which case, the meaning of those terms may be described in detail in the corresponding embodiment of the present disclosure. Therefore, the terms used herein may not be merely designations of the terms, but the terms may be defined based on the meaning of the terms and content throughout the present disclosure.

It is to be understood that a singular expression may also include the plural meaning as long as it is not inconsistent with the context. All the terms used herein, including technical and scientific terms, may have the same meanings as those generally understood by those of skill in the art.

Also, the terms described in the present disclosure, such as " . . . er (or)", " . . . unit", " . . . module", and the like, that denote a unit that performs at least one function or operation may be implemented as hardware, software, and/ or a combination thereof.

Throughout the present disclosure, when a part is referred to as being "connected to" another part, it may refer to the part being "directly connected to", "physically connected to" the other part, and/or "electrically connected to" the other part through an intervening element. In the present disclosure, the terms "transmit", "receive", and "communicate", as well as derivatives thereof, may encompass both direct and indirect communication. In addition, when a part is referred to as "including" or "comprising" a component, it may refer to that the part may additionally include or comprise other components rather than excluding other components as long as there is no particular opposing recitation.

Throughout the present disclosure, the expression "or" may be inclusive and not exclusive, as long as there is no particular opposing recitation. Thus, the expression "A or B" may refer to "A, B, or both" as long as it is not inconsistent with the context. In the present disclosure, the phrase "at least one of", when used with a list of items, may refer to different combinations of one or more of the listed items being used, and/or only one item in the list may be needed. For example, "at least one of: A, B, or C" may include any of the following combinations: A, B, C, A and B, A and C, B and C, or A and B and C.

The term "controller" may refer to any device, system or part thereof that controls at least one operation. Such a controller may be implemented in hardware, a combination of hardware and software, and/or firmware. The functionality associated with any particular controller may be centralized or distributed, whether locally or remotely.

Reference throughout the present disclosure to "one embodiment," "an embodiment," "an example embodiment," or similar language may indicate that a particular feature, structure, or characteristic described in connection with the indicated embodiment is included in at least one embodiment of the present solution. Thus, the phrases "in one embodiment", "in an embodiment," "in an example embodiment," and similar language throughout this disclosure may, but do not necessarily, all refer to the same embodiment.

It is to be understood that the specific order or hierarchy of blocks in the processes/flowcharts disclosed are an illustration of exemplary approaches. Based upon design preferences, it is understood that the specific order or hierarchy of blocks in the processes/flowcharts may be rearranged. Further, some blocks may be combined or omitted. The accompanying claims present elements of the various blocks in a sample order, and are not meant to be limited to the specific order or hierarchy presented.

Various embodiments of the present disclosure described below may be implemented and/or supported by one or more computer programs, which may be produced from computer-readable program code and/or stored in a computer-readable medium. In the present disclosure, the terms "application" and "program" may refer to one or more computer programs, software components, instruction sets, procedures, functions, objects, classes, instances, relevant data, which may be suitable for an implementation in computer-readable program code, or a part thereof. The term "computer-readable program code" may include various types of computer code including source code, object code, and executable code. The term "computer-readable medium" may include various types of media that is accessible by a computer, such as read-only memory (ROM), random-access memory (RAM), a hard disk drive (HDD), a compact disc (CD), a digital video disc (DVD), or various types of memory.

Additionally or alternatively, a computer-readable storage medium may be provided in the form of a non-transitory storage medium. The term "non-transitory storage medium" may refer to a tangible device, and may exclude wired, wireless, optical, or other communication links that transmit temporary electrical or other signals. In addition, the term "non-transitory storage medium" may not distinguish between a case in which data is stored in a storage medium semi-permanently and a case in which data is stored temporarily. For example, the non-transitory storage medium may include a buffer in which data is temporarily stored. A computer-readable medium may include any available medium that may be accessible by a computer, and may include a volatile or non-volatile medium and/or a removable or non-removable medium. The computer-readable media may include media in which data may be permanently stored and/or media in which data may be stored and overwritten later, such as, but not limited to, a rewritable optical disc or an erasable memory device.

According to an embodiment of the present disclosure, methods according to various embodiments of the present disclosure may be included in a computer program product and then provided. The computer program products may be traded as commodities between sellers and buyers. The computer program product may be distributed in the form of a machine-readable storage medium (e.g., a CD-ROM), and/or may be distributed (e.g., downloaded or uploaded) online through an application store (e.g., PlayStore™) and/or between two user devices (e.g., smart phones) directly. In a case of online distribution, at least a portion of the computer program product (e.g., a downloadable application) may be temporarily stored in a machine-readable storage medium such as a manufacturer's server, an application store's server, and/or a memory of a relay server.

Definitions of other particular words and phrases may be provided throughout the present disclosure. Those of skill in the art should understand that in many, if not most instances, such definitions apply to prior as well as future uses of such defined words and phrases.

In the present disclosure, each component described hereinafter may additionally perform some or all of functions performed by another component, in addition to main functions of itself, and some of the main functions of each component may be performed entirely by another component.

In the present disclosure, the term "machine learning" may refer to a field of artificial intelligence, and/or may refer to an algorithm for learning and/or executing an action that may not be empirically defined in code, based on data.

In the present disclosure, the term "reinforcement learning" may refer to a field of machine learning, and/or may refer to a method to be performed by a defined agent in a certain environment to recognize the current state and/or select an action or an action sequence that may maximize a reward from among a plurality of selectable actions.

In the present disclosure, the term "learning model" may refer to an example of a model for learning an action by using a reinforcement learning algorithm, and may not be limited to a model using a particular reinforcement learning algorithm.

In the present disclosure, the term "base station model" may refer to an agent that may be a subject of reinforcement learning, and/or may refer to a simulator that may determine an operation of a base station of a network digital twin. For example, the base station model may perform an operation of maximizing a reward for an environment input as a result of reinforcement learning.

In order to generate a network digital twin of a radio access network (RAN), it may be necessary to generate a simulator that may replicate an operation of a base station and/or may replicate network environment data collected from an actual base station. In order to replicate network environment data, base station data may be preprocessed, and simulation parameters that may produce a simulation result substantially similar to and/or the same as the base station data may be obtained. A significant number of computational resources may be required to perform such a process.

A process of training a base station model with reinforcement learning may include collecting base station data, preprocessing the collected base station data, and training a base station operation optimization model by setting arbitrary parameters in a generated network digital twin by using the preprocessed data.

Therefore, an electronic device according to an embodiment of the present disclosure may have various effects including an effect of reducing computational resource consumption by performing preprocessing to generate representative data by using base station data. Alternatively or additionally, the electronic device according to an embodiment of the present disclosure may have various effects including an effect of stably maintaining and/or operating a network state by training a learning model by using preprocessed data.

Hereinafter, an electronic device for generating representative base station data by using base station data and training a base station model is described.

FIG. 1 is a block diagram illustrating a configuration of an electronic device, according to an embodiment.

Referring to FIG. 1, the electronic device 100 may include a memory 110, a processor 120, and a transceiver 130. The number and arrangement of components of the electronic device 100 shown in FIG. 1 are provided as an example. In practice, there may be additional components, fewer components, different components, or differently arranged components than those shown in FIG. 1. Furthermore, two or more components shown in FIG. 1 may be implemented within a single component, or a single component shown in FIG. 1 may be implemented as multiple, distributed components. Alternatively or additionally, a set of (one or more) components shown in FIG. 1 may be integrated with each other, and/or may be implemented as an integrated circuit, as software, and/or a combination of circuits and software.

For example, the electronic device 100 may include an input unit for receiving, from a user, an input of a first time period, a second time period, and the like for generating representative data. Alternatively or additionally, the electronic device 100 may include an output unit for outputting a learning result.

In an embodiment, the operation of the processor 120 described below may be implemented as a software module stored in the memory 110. For example, the software module may be stored in the memory 110 and operated by being executed by the processor 120.

The memory 110 may be electrically connected to the processor 120, and may store commands and/or data related to operations of the components included in the electronic device 100. According to various embodiments of the present disclosure, the memory 110 may store base station data information obtained by using the transceiver 130, representative data generated by using the base station data, instructions for operations of a base station model, and the like.

According to an embodiment of the present disclosure, at least some modules included in respective units that may perform conceptually classified functions of a network digital twin simulator described below and/or the electronic device 100 may be implemented as software modules that may be executable by the processor 120, and/or the memory 110 may store instructions for executing such software modules.

The processor 120 may be electrically connected to the components included in the electronic device 100 to perform computations and/or data processing for control and/or communications of the components included in the electronic device 100. According to an embodiment of the present disclosure, the processor 120 may load, into the memory 110, a command and/or data received from at least one of the other components of the electronic device 100, process the command and/or data, and store resulting data in the memory 110.

FIG. 1 illustrates the processor 120 as one processor 120 for convenience of description only. However, the present disclosure is not limited in this regard. For example, at least one conceptually classified function of a learning model described below and/or the electronic device 100 may be implemented as a plurality of processors. That is, the processor 120 may not operate as one processor 120. Alternatively or additionally a plurality of processors may be implemented as separate hardware units configured to perform respective operations. A detailed description of the operation of the processor 120 is provided with reference to FIGS. 2 to 7.

The transceiver 130 may support establishment of a wired and/or a wireless communication channel between the electronic device 100 and an external electronic device (e.g., an external base station, a server that may control an external base station). Alternatively or additionally, communication between the electronic device 100 and the external electronic device may be performed through the established communication channel. For example, the transceiver 130 may receive data from the external electronic device and/or may transmit data to the external electronic device, through wired and/or wireless communication.

In an embodiment, data received by the transceiver 130 may include base station data related to an operating environment of a network digital twin to be used for reinforcement learning of a base station model. For example, the base station data may include a physical resource block (PRB) usage, an internet protocol (IP) throughput, a number of active user equipments (UEs), a downlink volume, and the like.

In an embodiment, the PRB usage may refer to a ratio of a number of used (e.g., occupied) PRBs to a total number of PRBs available for a certain time period. Alternatively or additionally, the PRB usage may be continuously (e.g., periodically, aperiodically) collected according to the time period.

The actual base station data may refer to data that may be used to perform reinforcement learning according to the operation of a base station model.

In an optional or additional embodiment, data received and/or transmitted by the transceiver 130 may include other types of data. That is, the data communications performed by the transceiver 130 are not limited thereto.

According to various embodiments of the present disclosure, the transceiver 130 may include a wireless communication module (e.g., a cellular communication module, a short-range wireless communication module, a global navigation satellite system (GNSS) communication module) and/or a wired communication module (e.g., a local area network (LAN) communication module, a power line communication module). Alternatively or additionally, the transceiver 130 may communicate with an external electronic device through a short-range communication network (e.g., Bluetooth™, Wireless-Fidelity (Wi-Fi) direct, Infrared Data Association (IrDA)) and/or a long-range communication network (e.g., a cellular network, the Internet, or a computer network (e.g., a LAN, a wide area network (WAN))), by using the wireless and/or wired communication module.

Hereinafter, functions of the electronic device 100 and an operation of a unit performing the functions are described with reference to FIG. 2.

Figure 2:
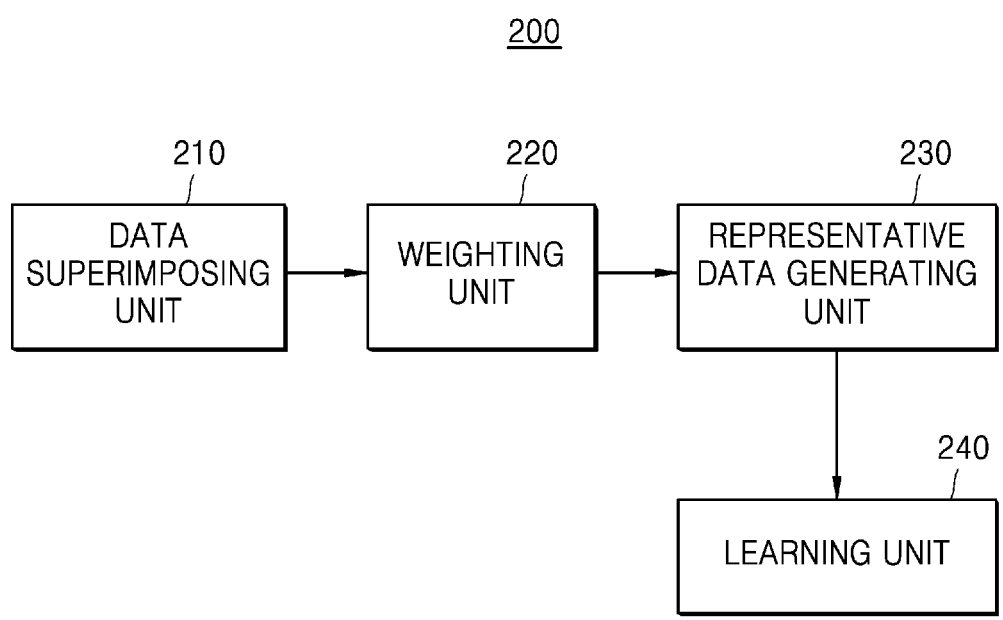
FIG. 2 is an exemplary block diagram illustrating functions of an electronic device, according to an embodiment.

FIG. 2 is an exemplary block diagram illustrating functions of an electronic device, according to an embodiment. An electronic device 200 of FIG. 2 may include or may be similar in many respects to the electronic device 100 described above with reference to FIG. 1, and may include additional features not mentioned above.

Referring to FIG. 2, the electronic device 200 may include a data superimposing unit 210, a weighting unit 220, a representative data generating unit 230, and a learning unit 240. However, the functions included in the electronic device 200 are not limited thereto. That is, the number and arrangement of components of the electronic device 200 shown in FIG. 2 are provided as an example. In practice, the electronic device 200 may omit some components, may include additional components that perform other functions, and/or components may differently arranged than as shown in FIG. 2. For example, the electronic device 200 may omit the weighting unit 220 and include only the data superimposing unit 210, the representative data generating unit 230, and the learning unit 240.

For convenience of description, the learning unit 240 of FIG. 2 may be described as operated by the processor 120 of FIG. 1. However, the present disclosure is not limited thereto. For example, a learning method of the learning unit 240 may be stored in the memory 110 of FIG. 1 to be performed according to a command of the processor 120. Alternatively or additionally, functions of the data superimposing unit 210, the weighting unit 220, and the representative data generating unit 230 may be performed by the operation of the processor 120.

For another example, the learning unit 240 may be implemented as a separate external device. That is, the electronic device 200 may transmit representative data to be input to the learning unit 240 and/or receive data output from the learning unit 240, by using the transceiver 130, for example.

According to an embodiment of the present disclosure, the data superimposing unit 210, the weighting unit 220, the representative data generating unit 230, and the learning unit 240, as shown in FIG. 2, may be provided to perform respective operations of the processor 120 of FIG. 1 that may be classified by function. Alternatively or additionally, operations of the respective units shown in FIG. 2 and/or the simulator may be stored as software in the memory 110 of FIG. 1, and then executed by the processor 120 to perform the respective functions. However, the present disclosure is not limited thereto.

In an optional or additional embodiment, the data superimposing unit 210, the weighting unit 220, the representative data generating unit 230, and the learning unit 240 may be implemented as one processor. That is, the data superimposing unit 210, the weighting unit 220, the representative data generating unit 230, and the learning unit 240 may be implemented as a dedicated processor and/or a combination of software and a general-purpose processor, such as an application processor (AP), a central processing unit (CPU) or a graphics processing unit (GPU).

In another optional or additional embodiment, the data superimposing unit 210, the weighting unit 220, the representative data generating unit 230, and the learning unit 240 may be implemented in a plurality of processors. That is, the data superimposing unit 210, the weighting unit 220, the representative data generating unit 230, and the learning unit 240 may be implemented as a combination of dedicated processors and/or a combination of software and general-purpose processors, such as APs, CPUs or CPUs.

The data superimposing unit 210 may divide base station data, which may be received through the transceiver 130, into a plurality of pieces of base station data, according to a preset first time unit. Alternatively or additionally, the data superimposing unit 210 may superimpose the plurality of pieces of base station data on each other to generate first data of the first time unit. The preset first time unit may refer to a predetermined time duration, such as, for example, 24 hours.

The base station data may include data about an environment of a base station. Alternatively or additionally, the base station data may include temporally continuous data and/or may include data recorded at preset time intervals. For example, the base station data may include a PRB usage, an IP throughput, a number of active UEs, a downlink volume, and the like.

Since base station data may be collected considering seasonal characteristics, base station data collected for several years may be required for reinforcement learning of the learning unit 240, Consequently, a significant number of computational resources may be required to preprocess the collected base station data, and, as a result, preprocessing computations may be complicated.

In an embodiment, the data superimposing unit 210 may perform preprocessing for superimposing pieces of base station data collected for several months on each other, for example. In the superimposed data obtained by the superimposing by the data superimposing unit 210, the pieces of base station data of the first time unit may be superimposed on each other in the first time unit, and thus, there may be various effects including an effect of reducing computational resources required to preprocess data used for reinforcement learning.

An example method, performed by the data superimposing unit 210, of superimposing pieces of base station data on each other is described with reference to FIG. 3.

In an embodiment, the weighting unit 220 may assign a weight to recently recorded base station data from among the superimposed data generated by the data superimposing unit 210 for a first time period.

Alternatively or additionally, in a case in which a representative data generating unit 230 performs random sampling on the superimposed data, the weighting unit 220 may assign weights to the recently recorded base station data to adjust the number of samples to be obtained through the random sampling, such that less samples may be obtained from earlier recorded data.

For example, in a case in which data obtained through the transceiver 130 includes a PRB usage recorded from day 1 to day 90, and the data superimposing unit 210 divides the received PRB usage according to a unit of 24 hours to generate superimposed data, the superimposed data for 24 hours may include 90 pieces of data for each hour. That is, the 90 pieces of data for each hour may consist of a plurality of pieces of data from day 1 to day 90.

In this case, the weighting unit 220 may set, to N, the number of random samples to be obtained from data recorded in a period between day 1 to day 30, where N is a positive integer greater than zero. Alternatively or additionally, the weighting unit 220 may set, to 1.1×N, the number of random samples to be obtained from data recorded in a period between day 31 to day 60. In such an example, the weighting unit 220 may set, to 1.2×N, the number of random samples to be obtained from data recorded in a period between day 61 to day 90.

That is, the weighting unit 220, according to an embodiment of the present disclosure, may assign a weight to recently recorded base station data by further increasing the number of samples to be obtained.

The number of samples and/or the periods set by the weighting unit 220 are merely examples, and other setting values may be set according to the received base station data, user settings, and/or design constraints of the electronic device 200. For example, the weighting unit 220 may set the first time period to 48 hours.

Alternatively or additionally, various known methods of adding a weight to recently recorded data other than the above-described method may be utilized. That is, the present disclosure is not limited in this regard. For example, in a case in which the representative data generating unit 230 generates a histogram for randomly sampled data, weights may be assigned such that earlier sampled data may be assigned a lower weight.

According to an embodiment of the present disclosure, in a case in which the electronic device 200 does not include the weighting unit 220, the electronic device 200 may set a same number of samples for the superimposed data regardless of time. That is, the superimposed data may contain a same number of samples for each first time unit.

The representative data generating unit 230, according to an embodiment of the present disclosure, may generate first representative data, based on the superimposed data generated by the data superimposing unit 210 and/or the weights set by the weighting unit 220.

For example, the representative data generating unit 230 may divide the superimposed data in preset second time interval units, and may calculate a probability density function for each second time interval. Alternatively or additionally, the representative data generating unit 230 may generate at least one piece of first representative data for the first time period by using the probability density function for each second time interval.

In an embodiment, the representative data generating unit 230 may randomly sample the first data divided according to the second time interval to generate a histogram for each second time interval. Alternatively or additionally, the representative data generating unit 230 may calculate the probability density function for each second time interval for the histogram for each second time interval. In an optional or additional embodiment, the representative data generating unit 230 may generate at least one piece of second representative data for each second time interval by using the probability density function for each second time interval. In another optional or additional embodiment, the representative data generating unit 230 may generate at least one piece of first representative data by connecting the at least one piece of second representative data for each second time interval to each other according to the second time interval.

The first representative data may include environmental data of a base station for training the learning unit 240. Alternatively or additionally, the first representative data may be generated by using a mean deviation and/or a standard deviation of the probability density function for each second time interval.

An example method, performed by the representative data generating unit 230, of generating first representative data is described with reference to FIG. 4.

In an embodiment, the representative data generating unit 230 may generate a network digital twin including a base station model by using the generated first representative data. The generating of a network digital twin may refer to setting whether a function of a base station model included in the network digital twin is activated, operating parameters related to an operation of the base station model, and/or at least one input parameter for replicating a commercial network base station. That is, the representative data generating unit 230 may set at least one parameter of the base station model included in the network digital twin in order to replicate an environment in which the commercial network base station operates, by using the first representative data.

The operating parameters related to the operation of the base station model may include at least one of a handover parameter, a selection or reselection parameter, a cell on/off parameter, and a load balancing parameter.

In an embodiment, the determining whether a function is activated may include determining whether at least one of a scheduling algorithm, a handover algorithm, and a discontinuous reception (DRX) algorithm is activated.

The at least one input parameter for replicating the commercial network base station may indicate at least one of an average packet size, an average request interval, and a number of terminals.

The representative data generating unit 230 may generate a small number of network digital twins by generating representative data from base station data of a commercial network base station, and, thus, may have various effects including reducing computational resources.

A network digital twin generated by the representative data generating unit 230 may be trained with reinforcement learning based on a result of applying various settings by the learning unit 240.

In order to train an operation of a base station model (e.g., base station model 245 of FIG. 6) with reinforcement learning, the learning unit 240 may train the operation of the base station model 245 by using the first representative data, which may be related to a base station environment and may be generated by the representative data generating unit 230.

An example method, performed by the learning unit 240, of training the operation of the base station model 245 by using the first representative data is described below with reference to FIGS. 6 and 7.

Figure 3:
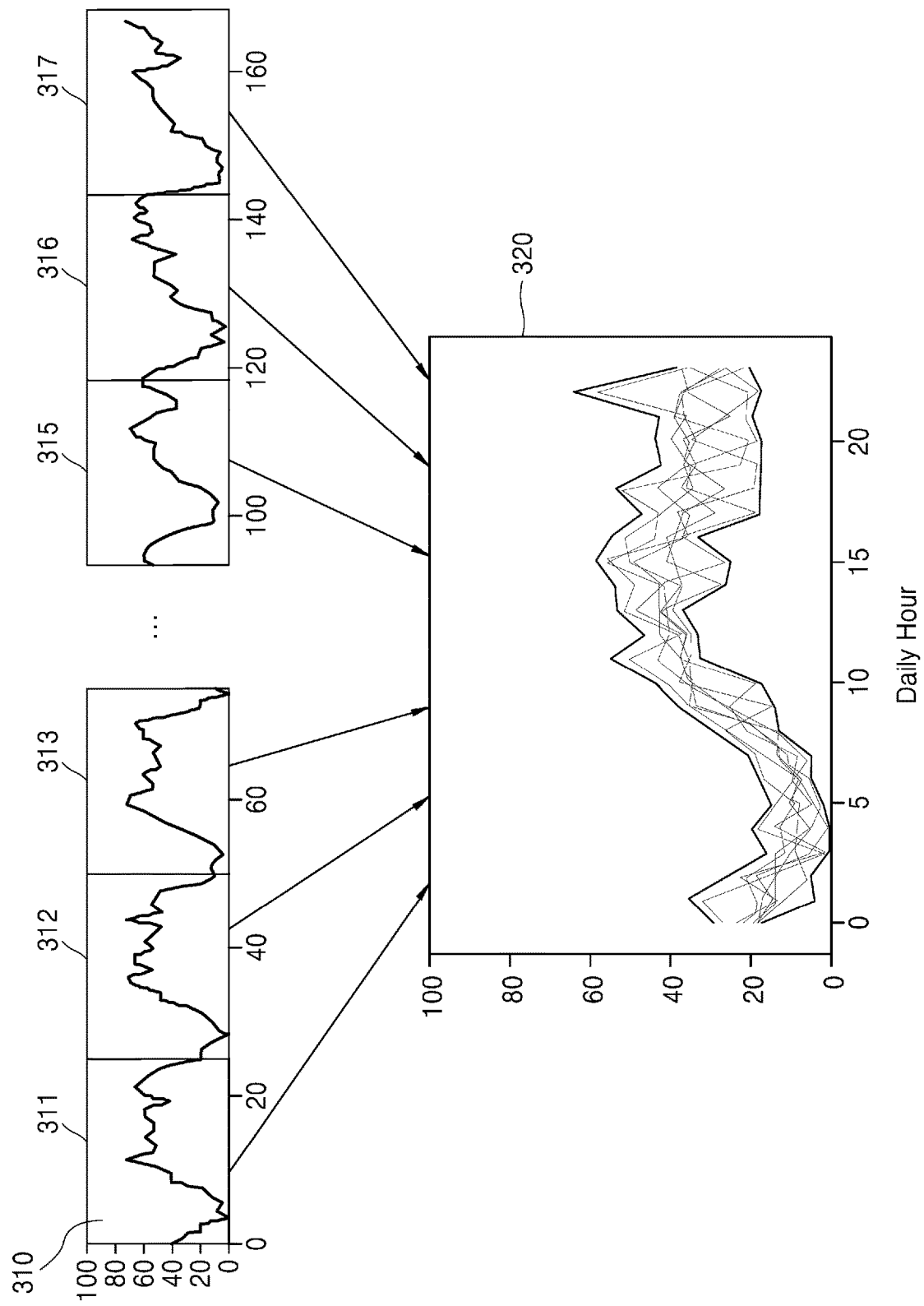
FIG. 3 illustrates superimposed data generated by an electronic device using base station data, according to an embodiment.

FIG. 3 illustrates superimposed data generated by an electronic device 200 using base station data, according to an embodiment.

Referring to FIGS. 2 and 3, the base station data 310 obtained by the electronic device 200 may include PRB usage and may have been recorded for 7 days, for example. In an embodiment, the data superimposing unit 210 may divide the obtained base station data 310 into 24-hour units (e.g., one-day units) to generate day-1 base station data 311, day-2 base station data 312, day-3 base station data 313, day-4 base station data 314, day-5 base station data 315, day-6 base station data 316, and day-7 base station data 317. As shown in FIG. 3, the x axis of the obtained base station data 310 may represent time (e.g., hour) from the first time point at which the base station data 310 is initially measured (e.g., hour 0) to the last time point at which the base station data 310 is finally measured (e.g., hour 168), and the y axis may represent PRB usage (in percentage (%) units).

In an embodiment, the PRB usage may show similar patterns every 24 hours. Consequently, the data superimposing unit 210 may set the first time interval to 24 hours.

The data superimposing unit 210, according to an embodiment, may generate superimposed data 320 by superimposing the generated day-1 base station data 311 to day-7 base station data 317 on each other into one graph, in which the x axis may represent the first time interval (e.g., 24 hours or 0:00 to 24:00). The y axis of the superimposed data 320 may represent the PRB usage in percentage units.

The superimposed data 320 may include data obtained by superimposing all data from the day-1 base station data 311 to the day-7 base station data 317 on each other into one piece of data spanning the first time interval (e.g., 24 hours), and may indicate a PRB usage for 7 days.

The superimposed data 320 generated by the data superimposing unit 210 may be used by the representative data generating unit 230 to generate first representative data.

The representative data generating unit 230 may generate a histogram for each second time interval by randomly sampling the base station data 310 divided according to the preset second time interval. Alternatively or additionally, the representative data generating unit 230 may calculate a probability density function for each second time interval with respect to the histogram for each second time intervals.

It is to be understood that the base station data 310, the superimposed data 320, and the generated day-1 base station data 311 to day-7 base station data 317 illustrated in FIG. 3 are merely one example, and that other embodiments may have different data and/or different time units. That is, the example illustrated in FIG. 3 is not intended to limit the scope of the present disclosure, but is merely representative of various embodiments.

Figure 4:
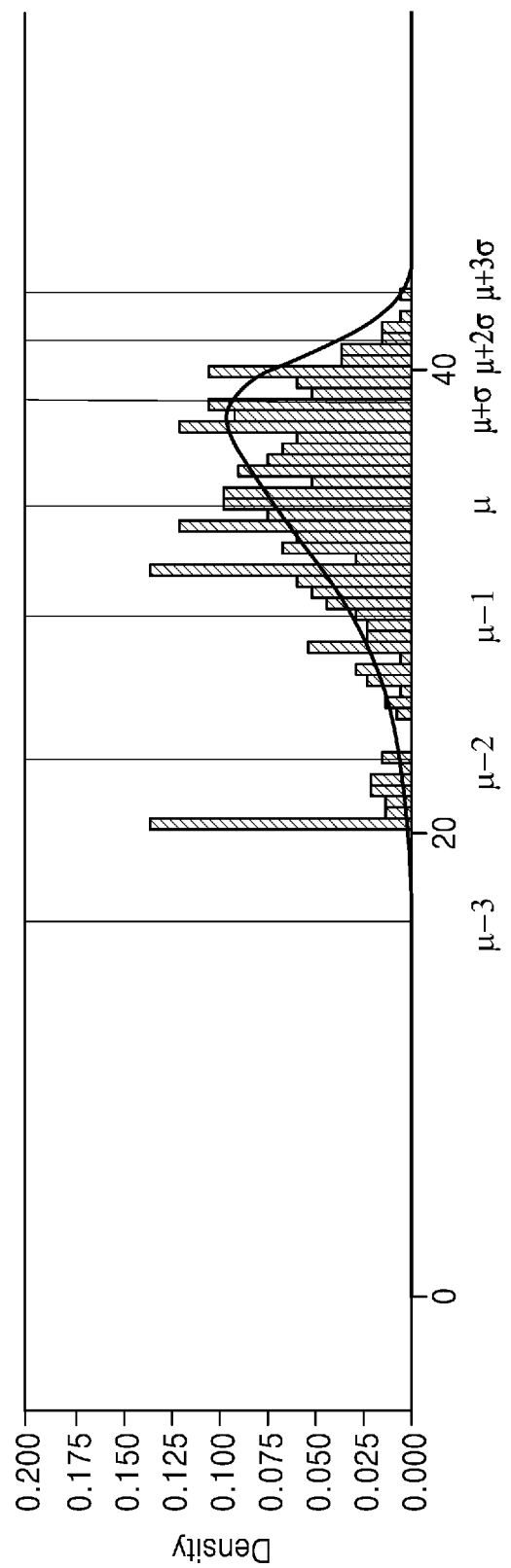
FIG. 4 illustrates representative data of a probability density function generated by an electronic device, according to an embodiment.

FIG. 4 illustrates representative data of a probability density function generated by an electronic device, according to an embodiment.

Referring to FIGS. 2 to 4, the x axis of the graph may present PRB usage in units of sampled percentages, and the y axis may represent a probability density (e.g., solid line) having a value between zero (0) and one (1).

In an embodiment, the representative data generating unit 230 may set the second time interval to 1 hour, and may perform random sampling on a section of the superimposed data 320 of FIG. 3 corresponding to a 4:00 hour to generate a histogram and/or a probability density function for a sampled PRB usage.

That is, assuming that the second time interval is set to 1 hour and random sampling is performed on data corresponding to the 4:00 section, the representative data generating unit 230 may randomly sample data of the time period between 3:30 and 4:30. For example, the representative data generating unit 230 may randomly sample N pieces of data from the PRB usage data of the time period between 3:30 and 4:30 in FIG. 3, where N is a positive integer greater than zero (0).

By using the above-described method, the representative data generating unit 230 may randomly sample data about the PRB usage for the 0:00 section to the 24:00 section. In this case, the 0:00 section may correspond to a time period from 0:00 to 0:30, and the 24:00 section may correspond to a time period from 23:30 to 24:00.

Alternatively or additionally, the second time interval set by the representative data generating unit 230 may be 2 hours. In this case, the representative data generating unit 230 may randomly sample N pieces of data for each of the 0:00 section, the 2:00 section, the 4:00 section, . . . , and the 24:00 section, where N is a positive integer greater than zero (0).

The representative data generating unit 230, according to an embodiment of the present disclosure, may perform random sampling such that, from among the first data divided according to the second time interval, a smaller number of samples are obtained from pieces of first data that are earlier recorded, based on the first time unit.

For example, in a case in which the base station data 310 of FIG. 3 includes data from day 1 to day 90, the first time unit is 24 hours, and the second time unit is 1 hour, the superimposed data 320 of FIG. 3 generated by the data superimposing unit 210 may include pieces of base station data from day 1 to day 90 superimposed on each other in a time period between 0:00 to 24:00. The representative data generating unit 230 may sample the superimposed data 320 of FIG. 3 for each time of generation, such that a smaller number of samples are obtained from earlier recorded data, on a 24-hour basis (e.g., on a one-day basis).

In an embodiment, in a case of randomly sampling N samples, the representative data generating unit 230 may randomly sample N/6 samples from the base station data 310 recorded between day 1 and day 30, randomly sample N/3 samples from the base station data 310 recorded between day 31 and day 60, and randomly sample N/2 samples from the base station data 310 recorded between day 61 and day 90.

That is, the representative data generating unit 230 may assign a weight to recently recorded data by randomly sampling a larger number of samples from the recently recorded data. Consequently, the representative data generating unit 230 may train a base station model 245 to be closer (e.g., more similar) to the latest operation environment of the base station data 310.

The representative data generating unit 230 may generate a histogram based on randomly sampled data for each time interval, generate a probability density function for each time interval from the generated histogram, and generate at least one piece of second representative data for time interval from the generated probability density function for each time interval.

The at least one piece of second representative data for each time interval may refer to data that may represent base station data 310 obtained at each time interval. For example, the second representative data may be a value calculated by using a mean $\mu$, a median, a maximum, a minimum, and/or a standard deviation $\sigma$ of the probability density function. Alternatively or additionally, the second representative data may include any value as long as the value may be used to represent the base station data 310 at each time interval According to an embodiment of the present disclosure, the at least one piece of second representative data for each time interval may be $\mu-3\sigma$, $\mu-2\sigma$, $\mu+2\sigma$, and $\mu+3\sigma$. That is, the representative data generating unit 230 may select, as the at least one piece of second representative data, $\mu\pm2\sigma$, which may indicate upper and lower boundary values between which the base station data 310 may exist with a probability of approximately 95%, and $\mu\pm3\sigma$, which may indicate upper and lower boundary values between which the base station data 310 may exist with a probability of approximately 99%.

As the representative data generating unit 230 selects $\mu-3\sigma$, $\mu-2\sigma$, $\mu+2\sigma$, and $\mu+3\sigma$ as the second representative data, the base station model 245 may be trained by using, as representative data, boundary value data having a high probability that an actual environment exists. In other words, the base station model 245 may be trained by receiving the best environment and the worst environment among actual base station environments.

The representative data generating unit 230, according to an embodiment of the present disclosure, may generate at least one piece of first representative data by connecting the at least one piece of second representative data for each second time interval to each other according to the second time interval. The first representative data may include a value obtained by connecting pieces of representative data of the base station data 310 for a first time period. The first representative data may be used interchangeably with the term "compaction" in the present disclosure.

Figure 5:
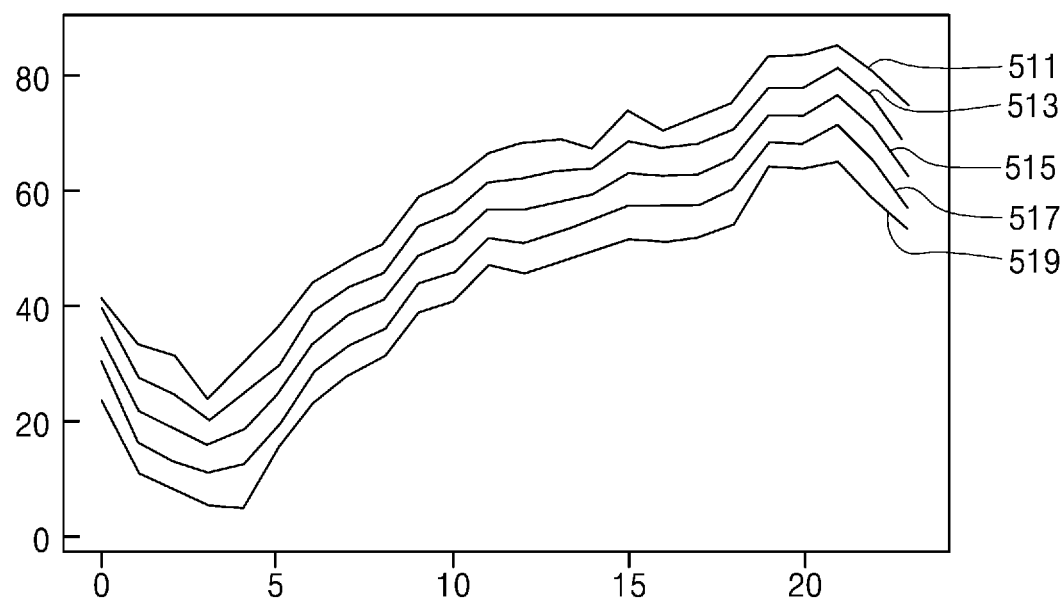
FIG. 5 illustrates representative data generated in a cycle of one day, according to an embodiment.

FIG. 5 illustrates representative data for a first time period, according to an embodiment of the present disclosure.

In FIG. 5, the x axis may represent time (e.g., hours) from 0:00 to 24:00, and the y axis may represent PRB usage measured in percentages.

Referring to FIGS. 2 and 5, the representative data generating unit 230 may indicate changes in first representative data during one day, which may be a first time unit, by connecting at least one piece of second representative data to each other to generate the first representative data.

For example, in a case in which $\mu-3\sigma$ is selected as the second representative data, the representative data generating unit 230 may generate a first compaction 511 by connecting a piece of second representative data for 0:00 to a piece of second representative data for 1:00 with a straight line, and connecting the piece of second representative data for 1:00 to a piece of second representative data for 2:00.

By using the above-described method, a second compaction 513 may be generated using $\mu-2\sigma$ as the second representative data, a third compaction 515 may be generated using $\mu$ as the second representative data, a fourth compaction 517 may be generated using $\mu-2\sigma$ as the second representative data, and a fifth compaction 519 may be generated using $\mu-3\sigma$ as the second representative data.

That is, the representative data generating unit 230 may generate at least one piece of first representative data by connecting pieces of representative data of the base station data 310 for respective second time intervals within the first time unit to each other.

For example, in a case in which the base station data 310 includes a PRB usage, the at least one piece of first representative data may include all representative situations, from the first compaction 511 in which the base station environment may not be good (e.g., high PRB usage), to the fifth compaction 519 in which the base station environment may be good (e.g., low PRB usage), among the base station data 310 for 90 days.

In an embodiment, an electronic device 200 may train the base station model 245 with reinforcement learning, by using a small amount of base station data 310 by selecting representative data. That is, the electronic device 200 may have various effects including an effect of increasing the rate of computations required for training as the number of simulations for each operation decreases according to a small amount of base station data 310.

The learning unit 240, according to an embodiment of the present disclosure, may train a base station model 245 for a network digital twin by using the at least one piece of first representative data generated by the representative data generating unit 230.

Figure 6:
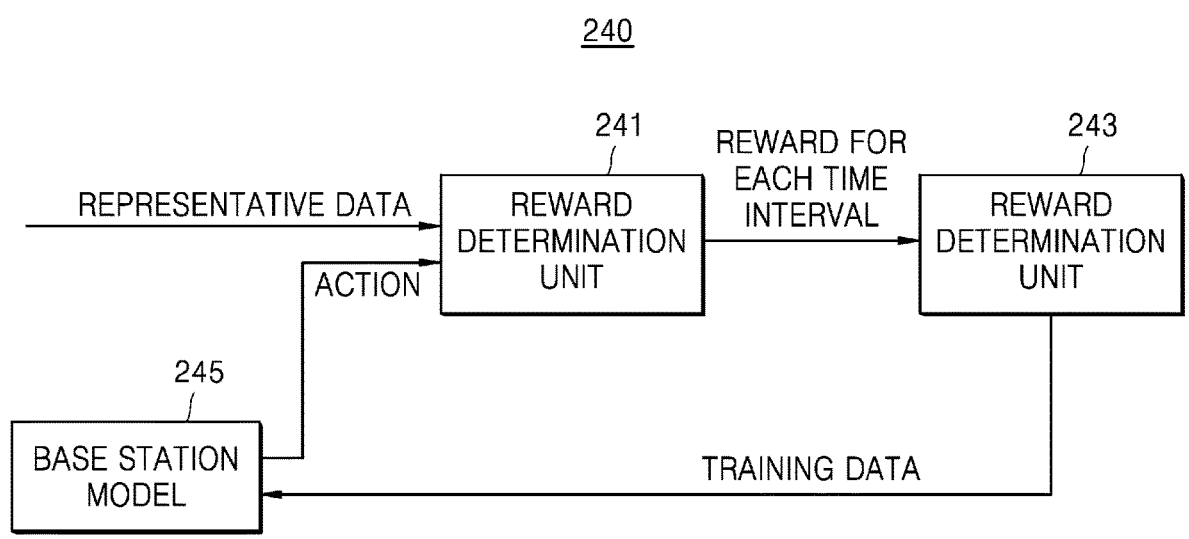
FIG. 6 is an exemplary block diagram illustrating a function of training a learning model, according to an embodiment.

FIG. 6 is an exemplary block diagram illustrating a function for a learning unit to train a base station model with reinforcement learning, according to an embodiment of the present disclosure.

Referring to FIG. 6, the learning unit 240 may include a reward determination unit 241, a reward determination unit 243 and the base station model 245. Although FIG. 6 shows the base station model 245 as being included in the learning unit 240 for convenience of description, the present disclosure is not limited thereto. For example, the base station model 245 may be stored in the memory 110 of FIG. 1, and/or may be stored in an external device (e.g., a server).

Reinforcement learning may be selected as a learning method of the learning unit 240. Reinforcement learning may refer to a field of machine learning, and may refer to a method of learning actions that may be optimal to perform in a current state. For example, in a learning method of reinforcement learning, a reward may be given by an external environment whenever an agent takes an action, and learning may be performed in order to maximize the reward.

The reward determination unit 241 may receive representative data generated by the representative data generating unit 230 and an action performed by the base station model 245 as an agent. Alternatively or additionally, the reward determination unit 241 may calculate a reward for each second time interval according to each action and an environment corresponding to the representative data.

That is, the reward determination unit 241 may simulate an action selectable by the base station model 245 for at least one piece of first representative data representing a base station environment, and/or may calculate a reward for each action for each second time interval.

The reward determination unit 243 may transmit training data to the base station model 245, based on the reward for each time interval calculated by the reward determination unit 241. For example, the reward determination unit 243 may provide the training data by using the sum of minimum rewards for the respective time intervals, such that the base station model 245 may not (e.g., be prevented from) perform an action corresponding to the minimum reward.

That is, the reward determination unit 243 may generate the training data to train the base station model 245 such that the base station model 245 may safely operate and/or avoid key performance indicator (KPI) degradation that may occur by performing each action for the base station environment represented by the first representative data. Alternatively or additionally, the base station model 245 may operate in a manner that may maximize an energy saving.

The base station model 245, according to an embodiment of the present disclosure, may include a model obtained by replicating an actual base station, for constructing a network digital twin. Alternatively or additionally, the base station model 245 may be a subject of learning, that is, an agent of reinforcement learning that may perform an action according to a reward.

In an embodiment, the base station model 245 may be preconfigured to perform functions similar to those of an actual base station, and/or may receive (e.g., from a user) an input of a plurality of actions of a base station with various relevant setting values.

For example, actions of the base station model 245 may include, but not be limited to, an action of turning on at least one cell and an action of turning off the at least one cell, based on a PRB usage.

A process of training the base station model 245 with reinforcement learning by using at least one piece of first representative data is described with reference to FIG. 7.

Figure 7:
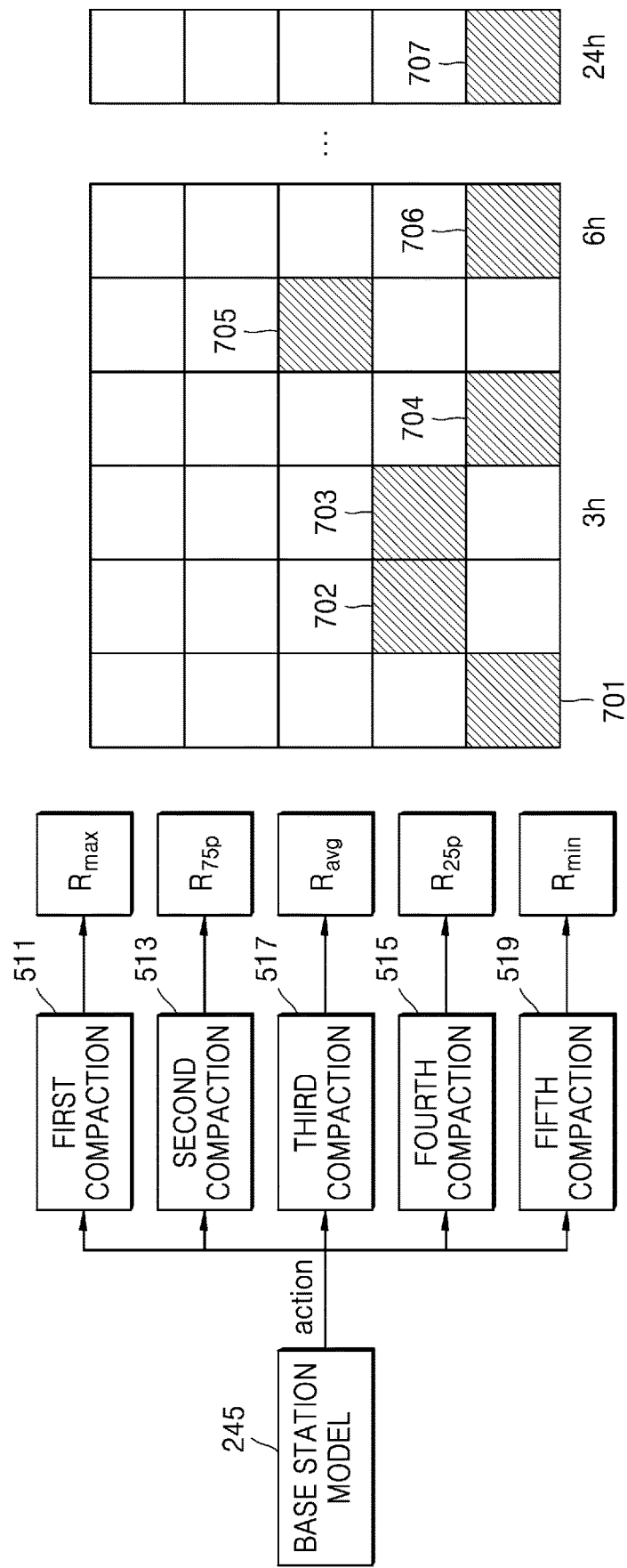
FIG. 7 illustrates a process of outputting a reward value to train a base station model, according to an embodiment.

FIG. 7 illustrates a process of outputting a reward value to train a base station model, according to an embodiment.

Referring to FIGS. 6 and 7, the reward determination unit 241 may perform simulations such that the base station model 245 may perform an action for each second time interval of the base station environments (e.g., first compaction 511, second compaction 513, third compaction 515, fourth compaction 517, and fifth compaction 519). In an embodiment, the actions performed by the base station model 245 in the first compaction 511 to the fifth compaction 519 may correspond to rewards that may be defined as Rmax, R75p, Ravg, R25p, and Rmin, respectively.

The state of the base station model 245 may change from a particular state of the base station model 245 according to the action performed by the base station model 245. Accordingly, the reward determination unit 241 may calculate a reward value according to a predefined rule, based on the changed state of the base station model 245.

The predefined rule may include a rule for ensuring communication performance and/or maximizing a power saving. Alternatively or additionally, the predefined rule may include a rule configured to decrease the reward as the power consumption increases. In another example, the predefined rule may include a rule configured to set the reward to a negative value when the IP throughput is less than a preset value.

However, the present disclosure is not limited in this regard. That is, various known rules may be applied to the predefined rule according to design constraints and/or the environment of the base station.

In an embodiment, the base station model 245 may perform actions in the environments of the first compaction 511 to the fifth compaction 519 for each second time interval. Consequently, the reward determination unit 241 may calculate the rewards for the respective time intervals to maximize the power saving while ensuring the communication performance. That is, the reward determination unit 241 may select, as the reward for the corresponding second time interval, the minimum reward from among the rewards for the first compaction 511 to the fifth compaction 519 for each second time interval, such that KPI degradation may be minimized.

For example, at 3:00, in a case in which the reward Rmax for the first compaction 511 may be calculated to be 10, the reward R75p for the second compaction 513 may be calculated to be 7, the reward Ravg for the third compaction 515 may be calculated to be 6, the reward R25p for the fourth compaction 517 may be calculated to be −1, and the reward Rmin for the fifth compaction 519 may be calculated to be 1, the reward determination unit 241 may select a reward 703 of the fourth compaction 517 (e.g., the minimum reward value), as the reward for 3:00. Alternatively or additionally, the reward determination unit 241 may, in a similar manner, calculate and select a reward 701 for 1:00, a reward 702 for 2:00, a reward 704 for 4:00, a reward 705 for 5:00, a reward 706 for 6:00, to a reward 707 for 24:00.

In an embodiment, the reward determination unit 243 may receive the reward for each second time interval from the reward determination unit 241 and may calculate training data using the following equation:

$$\left(a, \sum_{Z4}^{t=1} \min_{c \in C} R_c^t\right) \qquad \text{(Equation 1)}$$

Here, a may represent an action performed by the base station model 245, t may represent the second time interval, c may represent each compaction, and R_c^t may represent a reward for each compaction at each time interval.

That is, the reward determination unit 243 may transmit, to the base station model 245, training data including the actions performed by the base station model 245 and the sum of minimum values of the rewards for the respective actions, to train the base station model 245 with reinforcement learning.

The base station model 245, according to an embodiment of the present disclosure, may be trained to perform an action that may maximize the reward by using the training data obtained from the reward determination unit 243. Alternatively or additionally, the base station model 245 may be trained not to perform an action with the lowest sum of calculated reward values.

As such, the electronic device 200 may train the base station model 245 with reinforcement learning to minimize KPI deterioration while generating various effects including an energy saving effect.

Continuing to refer to FIG. 7, exemplary configuration and functions of the electronic device 200 for generating base station representative data for training a base station model 245 have been described. Hereinafter, an example method, performed by the electronic device 200, of generating representative data for training a base station model 245 is described with respect to FIG. 8.

Figure 8:
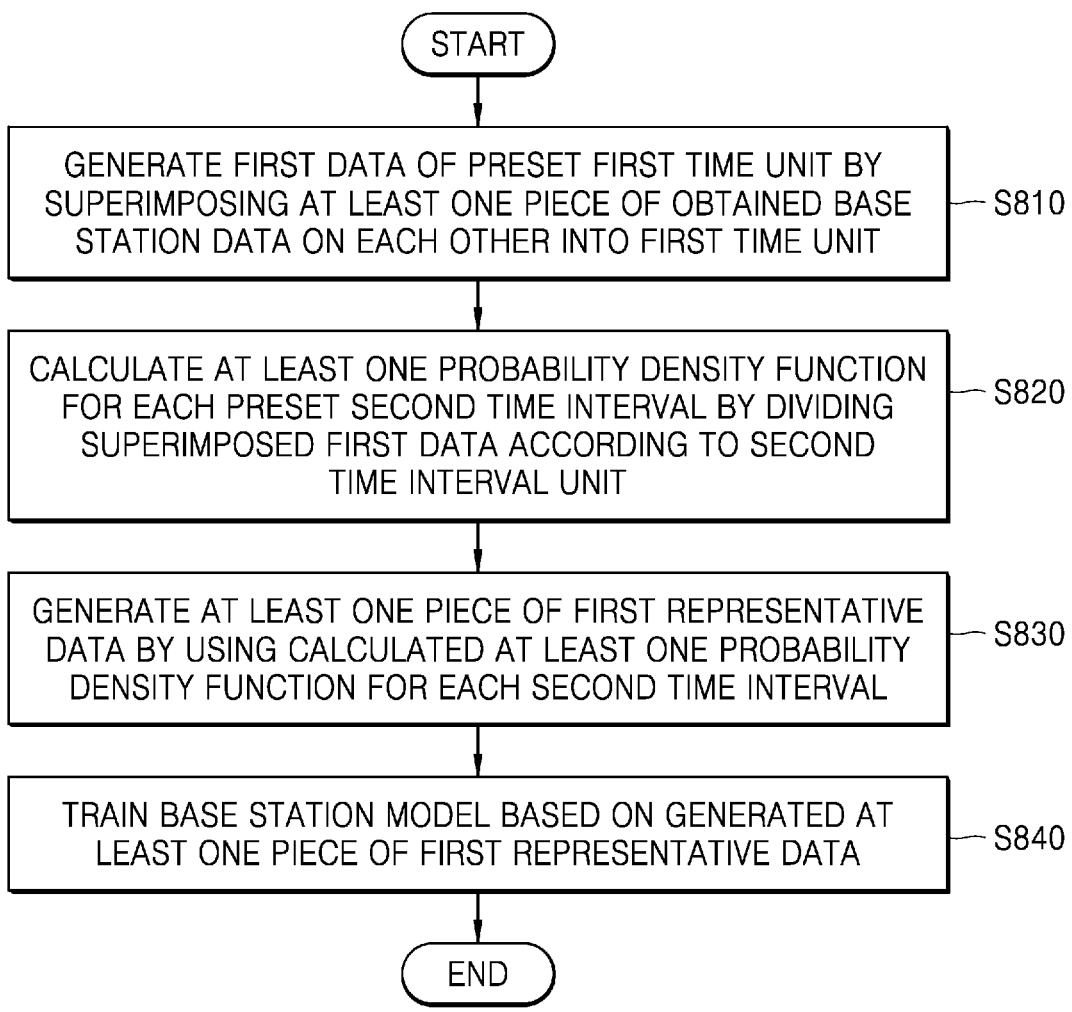
FIG. 8 is a flowchart illustrating a method, performed by an electronic device, of generating representative data for training a learning model, according to an embodiment.

FIG. 8 is a flowchart illustrating an example method, performed by an electronic device, of generating representative data for training a base station model, according to an embodiment.

Referring to FIGS. 2 and 8, the electronic device 200 may generate first data of a preset first time unit by superimposing at least one piece of obtained base station data 310 on each other into the first time unit (operation S810).

The base station data 310, according to an embodiment of the present disclosure, may include at least one of a PRB usage, an IP throughput, a number of active UEs, and a downlink volume.

In an embodiment, the PRB usage may refer to a ratio of a number of used (e.g., occupied) PRBs to a total number of PRBs available for a certain time period. Alternatively or additionally, the PRB usage may be continuously (e.g., periodically, aperiodically) collected according to the time period.

The electronic device 200 may calculate at least one probability density function for each preset second time interval by dividing the superimposed first data according to the second time interval unit (operation S820).

For example, the electronic device 200 may generate a histogram for each second time interval by randomly sampling the base station data 310 divided according to the preset second time interval. Alternatively or additionally, the electronic device 200 may calculate a probability density function for each second time interval with respect to the histogram for each second time intervals.

The electronic device 200 may generate at least one piece of first representative data by using the calculated at least one probability density function for each second time interval (operation S830).

In an embodiment, the electronic device 200 may randomly sample the first data divided according to the second time interval to generate a histogram for each second time interval. Alternatively or additionally, the electronic device 200 may calculate a probability density function for each second time interval for the histogram for each second time interval. In an optional or additional embodiment, the electronic device 200 may generate at least one piece of second representative data for each second time interval by using the probability density function for each second time interval. In another optional or additional embodiment, the electronic device 200 may generate at least one piece of first representative data by connecting the at least one piece of second representative data for each second time interval to each other according to the second time interval.

The first representative data, according to an embodiment of the present disclosure, may include environmental data of a base station for training a base station model 245. Alternatively or additionally, the first representative data may have been generated by using a mean deviation and/or a standard deviation of the probability density function for each second time interval.

The electronic device 200 may train the base station model 245 based on the generated at least one piece of first representative data (operation S840).

In an embodiment, the base station model 245 may include a model obtained by replicating an actual base station, for constructing a network digital twin. Alternatively or additionally, the base station model 245 may be a subject of learning. That is, the base station model 245 may be an agent of reinforcement learning that may perform an action according to a reward.

In an embodiment, the base station model 245 may be preconfigured to perform functions similar to those of an actual base station Alternatively or additionally, the base station model 245 may receive (e.g., from a user) an input of a plurality of actions of a base station with various relevant setting values.

Figure 9:
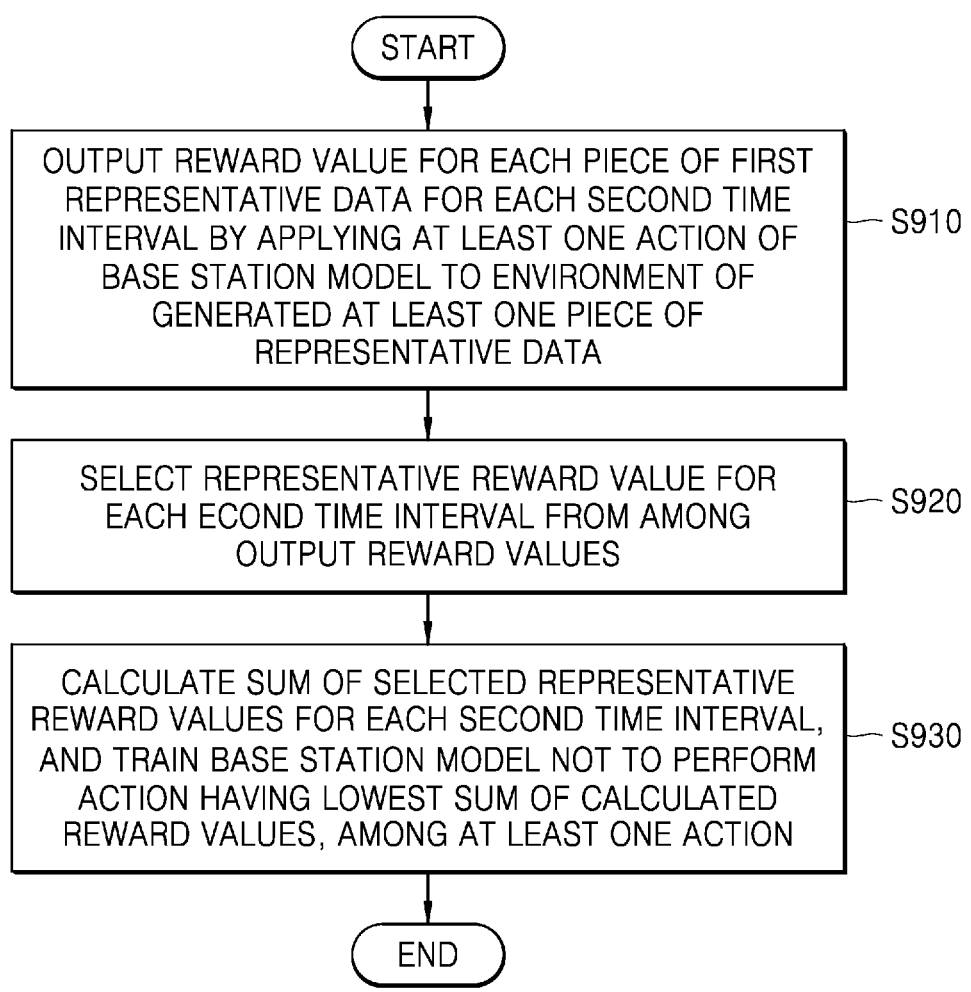
FIG. 9 is a flowchart illustrating a method of training a learning model, according to an embodiment.

FIG. 9 is a flowchart illustrating an example method of training a base station model, according to an embodiment.

Referring to FIGS. 2 and 9, the electronic device 200 may output a reward value for each piece of first representative data for each second time interval by applying at least one action of the base station model 245 to an environment of the generated at least one piece of representative data (operation S910).

In an embodiment, the actions of the base station model 245 may include an action of turning on at least one cell and/or an action of turning off the at least one cell, based on a PRB usage.

Alternatively or additionally, the state of the base station model 245 may change from a particular state according to the action of the base station model 245. Accordingly, a reward value may be may calculated according to a predefined rule, based on the changed state of the base station model 245.

The predefined rule may include a rule for ensuring communication performance and/or maximizing a power saving. Alternatively or additionally, the predefined rule may include a rule configured to decrease the reward as the power consumption increases. In another example, the predefined rule may include a rule configured to set the reward to a negative value when the IP throughput is less than a preset value.

However, the present disclosure is not limited in this regard. That is, various known rules may be applied to the predefined rule according to design constraints and/or the environment of the base station.

Alternatively or additionally, the electronic device 200 may receive an input of representative data and an action of the base station model 245 as an agent. Consequently, the electronic device 200 may output a reward for each second time interval according to the action and an environment corresponding to the representative data.

The electronic device 200 may select a representative reward value for each second time interval from among the output reward values (operation S920).

In an embodiment, the lowest reward value for each second time interval among the at least one piece of first representative data may be selected as the representative reward value for each second time interval. Accordingly, the electronic device 200 may calculate the representative reward for each second time interval to maximize a power saving while ensuring communication performance.

The electronic device 200 may calculate the sum of the selected representative reward values for each second time interval, and train the base station model 245 not to perform the action having the lowest sum of calculated reward values, among the at least one action (operation S930).

In an embodiment, the electronic device 200 for generating representative data for training a base station model 245 may include a memory 110 storing one or more instructions, a transceiver 130, and at least one processor 120 configured to execute the one or more instructions stored in the memory 110. When the instructions are executed, the at least one processor 120 may divide base station data 310 received through the transceiver 130 into a plurality of pieces of base station data according to a preset first time unit, and generate first data of the first time unit by superimposing the plurality of pieces of base station data on each other. When the instructions are further executed, the at least one processor 120 may calculate at least one probability density function for each preset second time interval by dividing the superimposed first data according to the second time interval unit. When the instructions are further executed, the at least one processor 120 may generate at least one piece of first representative data by using the at least one probability density function for each second time interval. When the instructions are further executed, the at least one processor 120 may train the base station model 245, based on the generated at least one piece of first representative data.

In an embodiment, the base station data 310 may include at least one of a PRB usage, an IP throughput, a number of active UEs, and a downlink volume.

In an embodiment, when the instructions are further executed, the at least one processor 120 may generate a histogram for each second time interval by performing random sampling on the first data divided according to the second time interval. When the instructions are further executed, the at least one processor 120 may calculate a probability density function for each second time interval for the histogram for each second time interval. When the instructions are further executed, the at least one processor 120 may select at least one piece of second representative data for each second time interval by using the probability density function for each second time interval. When the instructions are further executed, the at least one processor 120 may generate the at least one piece of first representative data by connecting the at least one piece of second representative data for each second time interval to each other according to the second time interval.

In an embodiment, when the instructions are further executed, the at least one processor 120 may perform the random sampling such that, from among the first data divided according to the second time interval, a smaller number of samples are obtained from pieces of first data that are earlier recorded, based on the first time unit.

In an embodiment, when the instructions are further executed, the at least one processor 120 may select the at least one piece of second representative data for each second time interval by using a mean and standard deviation of the probability density function for each second time interval.

In an embodiment, when the instructions are further executed, the at least one processor 120 may generate a network digital twin including the base station model 245 by setting, based on the generated at least one piece of representative data, at least one parameter of the network digital twin. When the instructions are further executed, the at least one processor 120 may output a reward value for each of the at least one piece of first representative data for each second time interval by applying at least one action of the base station model 245 to an environment of the generated at least one piece of representative data. When the instructions are further executed, the at least one processor 120 may select a representative reward value for each second time interval from among the output reward values. When the instructions are further executed, the at least one processor 120 may train the base station model 245 not to perform an action having the lowest sum of calculated reward values, among the at least one action, by calculating the sum of the selected representative reward values for each second time interval.

In an embodiment, when the instructions are further executed, the at least one processor 120 may select, as the representative reward value for each second time interval, a lowest reward value for each second time interval, from among the output reward values.

In an embodiment, the at least one action of the base station model 245 may include at least one of an action of turning on at least one cell and an action of turning off the at least one cell, based on a PRB usage.

In an embodiment, the action of turning on the at least one cell may include, in a case in which the IP throughput and/or the PRB usage of a certain frequency band is greater than or equal to a preset first value, turning on at least one cell of the frequency band. In an optional or additional embodiment, the action of turning off the at least one cell may include, in a case in which the IP throughput and/or the PRB usage of a certain frequency band is less than or equal to a preset second value, turning off at least one cell of the frequency band.

A method of generating representative data for training a base station model 245, according to an embodiment of the present disclosure, may include dividing base station data 310 into a plurality of pieces of base station data according to a preset first time unit, generating first data of the first time unit by superimposing the plurality of pieces of base station data on each other, calculating at least one probability density function for each preset second time interval by dividing the superimposed first data according to the second time interval unit, generating at least one piece of first representative data by using the probability density function for each second time interval, and training the base station model 245, based on the generated at least one piece of first representative data.

In an embodiment, the base station data 310 may include at least one of a PRB usage, an IP throughput, a number of active UEs, and a downlink volume.

In an embodiment, the calculating of the at least one probability density function may include generating a histogram for each second time interval by randomly sampling the first data divided according to the second time interval, and calculating a probability density function for each second time interval for the histogram for each second time interval. In an embodiment, the generating of the at least one piece of first representative data may include generating at least one piece of second representative data for each second time interval by using the probability density function for each second time interval, and generating the at least one piece of first representative data by connecting the at least one piece of second representative data for each second time interval to each other according to the second time interval.

In an embodiment, the generating of the histogram for each second time interval may include performing the random sampling such that, from among the first data divided according to the second time interval, a smaller number of samples are obtained from pieces of first data that are earlier recorded, based on the first time unit.

In an embodiment, the generating of the at least one piece of second representative data may include generating the at least one piece of second representative data for each second time interval, by using a mean and a standard deviation of the probability density function for each second time interval.

In an embodiment, the training of the base station model 245 may include generating a network digital twin including the base station model 245 by setting, based on the generated at least one piece of representative data, at least one parameter of the network digital twin, outputting a reward value for each of the at least one piece of first representative data for each second time interval by applying at least one action of the base station model 245 to an environment of the generated at least one piece of representative data, selecting a representative reward value for each second time interval from among the output reward values, and training the base station model 245 not to perform an action having the lowest sum of calculated reward values, among the at least one action, by calculating the sum of the selected representative reward values for each second time interval.

In an embodiment, the selecting of the representative reward value for each second time interval may include selecting, as the representative reward value for each second time interval, a lowest reward value for each second time interval, from among the output reward values.

In an embodiment, the at least one action of the base station model 245 may include at least one of an action of turning on at least one cell and an action of turning off the at least one cell, based on an IP throughput and/or a PRB usage.

In an embodiment, the action of turning on the at least one cell may include, in a case in which the IP throughput and/or the PRB usage of a certain frequency band is greater than or equal to a preset first value, turning on at least one cell of the frequency band. In an optional or additional embodiment, the action of turning off the at least one cell may include, in a case in which the IP throughput or the PRB usage of a certain frequency band is less than or equal to a preset second value, turning off at least one cell of the frequency band.

As a technical unit for achieving the above-described technical object, a computer-readable medium may include one or more pieces of program code. When executed by an electronic device (e.g., electronic device 100 of FIG. 1, electronic device 200 of FIG. 2), the one or more pieces of program code may execute a method including dividing base station data 310 into a plurality of pieces of base station data according to a preset first time unit, generating first data of the first time unit by superimposing the plurality of pieces of base station data on each other, calculating at least one probability density function for each preset second time interval by dividing the superimposed first data according to the second time interval unit, generating at least one piece of first representative data by using the probability density function for each second time interval, and training the base station model 245, based on the generated at least one piece of first representative data.

The recording medium disclosed as a technical unit for achieving the above-described technical object may store a program for executing at least one of the methods according to embodiments of the present disclosure.

The machine-readable storage medium may be provided in the form of a non-transitory storage medium. The term "non-transitory storage medium" may refer to a tangible device and may not include a signal (e.g., an electromagnetic wave), and the term "non-transitory storage medium" may not distinguish between a case where data is stored in a storage medium semi-permanently and a case where data may be stored temporarily. For example, the non-transitory storage medium may include a buffer in which data is temporarily stored.

The previous description is provided to enable a person skilled in the art to practice the various aspects described herein. Various modifications to these aspects are to be readily apparent to those skilled in the art, and the generic principles defined herein may be applied to other aspects. Thus, the claims are not intended to be limited to the aspects shown herein, but are to be accorded the full scope consistent with the language of the claims.

What is claimed is:

1. An electronic device for generating representative data for training a base station model, the electronic device comprising:
   a memory storing one or more instructions;
   a transceiver configured to receive base station data; and
   at least one processor configured to execute the one or more instructions stored in the memory to:
      divide the base station data into a plurality of pieces of base station data according to a first time unit;
      generate first data of the first time unit by superimposing the plurality of pieces of base station data on each other;
      divide the first data of the first time unit into a plurality of second time interval base station data, according to a second time interval unit;
      calculate at least one probability density function for each second time interval base station data of the plurality of second time interval base station data;
      generate at least one piece of first representative data by using respective probability density functions of the plurality of second time interval base station data; and
      train the base station model, based on the at least one piece of first representative data.

2. The electronic device of claim 1, wherein the base station data comprises data related to one of a physical resource block (PRB) usage, an internet protocol (IP) throughput, a number of active user equipments (UEs), and a downlink volume.

3. The electronic device of claim 1, wherein the at least one processor is further configured to execute the one or more instructions to:
   generate a histogram for each second time interval of the plurality of second time interval base station data by performing random sampling on each second time interval of the plurality of second time interval base station data;
   calculate a probability density function for each second time interval of the plurality of second time interval base station data based on a corresponding histogram of each second time interval of the plurality of second time interval base station data;
   select at least one piece of second representative data for each second time interval of the plurality of second time interval base station data by using a corresponding probability density function of each second time interval of the plurality of second time interval base station data; and
   generate the at least one piece of first representative data by connecting the at least one piece of second representative data of each second time interval of the plurality of second time interval base station data to each other, according to the plurality of second time interval base station data.

4. The electronic device of claim 3, wherein the at least one processor is further configured to execute the one or more instructions to:
perform the random sampling for each second time interval such that, from among the plurality of second time interval base station data, a first number of first samples corresponding to first portions of the second time interval base station data is less than a second number of second samples corresponding to second portions of the second time interval base station data, the first portions of the second time interval base station data having been recorded earlier than the second portions of the second time interval base station data.

5. The electronic device of claim 3, wherein the at least one processor is further configured to execute the one or more instructions to select the at least one piece of second representative data for each second time interval of the plurality of second time intervals by using a mean deviation and a standard deviation of the corresponding probability density function of each second time interval of the plurality of second time interval base station data.

6. The electronic device of claim 1, wherein the at least one processor is further configured to execute the one or more instructions to:
generate a network digital twin comprising the base station model by setting, based on the at least one piece of first representative data, at least one parameter of the network digital twin;
output a reward value for each of the at least one piece of first representative data for each second time interval of the plurality of second time intervals by applying at least one action of the base station model to an environment of the at least one piece of first representative data;
select a representative reward value for each second time interval of the plurality of second time intervals from among the output reward values; and
train the base station model to prevent performing an action having a lowest sum of calculated reward values, among the at least one action, by calculating a sum of the selected representative reward values for each second time interval of the plurality of second time intervals.

7. The electronic device of claim 6, wherein the at least one processor is further configured to execute the one or more instructions to select, as the representative reward value for each second time interval of the plurality of second time intervals, a lowest reward value for each second time interval of the plurality of second time intervals, from among the output reward values.

8. The electronic device of claim 6, wherein the at least one action of the base station model comprises turning on at least one cell and turning off the at least one cell, based on at least one of internet protocol (IP) throughput and a physical resource block (PRB) usage.

9. The electronic device of claim 8, wherein:
the turning on of the at least one cell comprises, in a case in which the at least one of the IP throughput and the PRB usage of a first frequency band is greater than or equal to a preset first value, turning on at least one first cell of the first frequency band, and
the turning off of the at least one cell comprises, in a case in which the at least one of the IP throughput and the PRB usage of a second frequency band is less than or equal to a preset second value, turning off at least one second cell of the second frequency band.

10. A method of generating representative data for training a base station model, the method comprising:
dividing base station data into a plurality of pieces of base station data according to a first time unit;
generating first data of the first time unit by superimposing the plurality of pieces of base station data on each other;
dividing the first data of the first time unit into a plurality of second time intervals, according to a second time interval unit;
calculating at least one probability density function for each second time interval of the plurality of second time intervals;
generating at least one piece of first representative data by using respective probability density functions of the plurality of second time intervals; and
training the base station model, based on the at least one piece of first representative data.

11. The method of claim 10, wherein the base station data comprises data regarding one of a physical resource block (PRB) usage, an internet protocol (IP) throughput, a number of active user equipments (UEs), and a downlink volume.

12. The method of claim 10, wherein:
the calculating of the at least one probability density function comprises:
generating a histogram for each second time interval of the plurality of second time intervals by randomly sampling the first data of the first time unit; and
calculating a probability density function for each second time interval of the plurality of second time intervals based on a corresponding histogram of each second time interval of the plurality of second time intervals; and
the generating of the at least one piece of first representative data comprises:
generating at least one piece of second representative data for each second time interval of the plurality of second time intervals by using a corresponding probability density function of each second time interval of the plurality of second time intervals; and
generating the at least one piece of first representative data by connecting the at least one piece of second representative data of each second time interval of the plurality of second time intervals to each other, according to the plurality of second time intervals.

13. The method of claim 12, wherein the generating of the histogram comprises performing the random sampling such that, from among the first data of the first time unit, a first number of first samples corresponding to first portions of the first data is less than a second number of second samples corresponding to second portions of the first data, the first portions of the first data having been recorded earlier than the second portions of the first data.

14. The method of claim 12, wherein the generating of the at least one piece of second representative data comprises generating the at least one piece of second representative data for each second time interval of the plurality of second time intervals, by using a mean deviation and a standard deviation of the corresponding probability density function of each second time interval of the plurality of second time intervals.

15. The method of claim 10, wherein the training of the base station model comprises:
generating a network digital twin comprising the base station model by setting, based on the at least one piece of first representative data, at least one parameter of the network digital twin;

outputting a reward value for each of the at least one piece of first representative data for each second time interval of the plurality of second time intervals by applying at least one action of the base station model to an environment of the at least one piece of first representative data;

selecting a representative reward value for each second time interval of the plurality of second time intervals from among the output reward values; and training the base station model to prevent performing an action having a lowest sum of calculated reward values, among the at least one action, by calculating a sum of the selected representative reward values for each second time interval of the plurality of second time intervals.

16. The method of claim 15, wherein the selecting of the representative reward value for each second time interval of the plurality of second time intervals comprises selecting, as the representative reward value for each second time interval of the plurality of second time intervals, a lowest reward value for each second time interval, from among the output reward values.

17. The method of claim 15, wherein the at least one action of the base station model comprises turning on at least one cell and turning off the at least one cell, based on at least one of an internet protocol (IP) throughput and a physical resource block (PRB) usage.

18. The method of claim 17, wherein:
the turning on of the at least one cell comprises, in a case in which the at least one of the IP throughput and the PRB usage of a first frequency band is greater than or equal to a preset first value, turning on at least one first cell of the first frequency band, and the turning off of the at least one cell comprises, in a case in which the at least one of the IP throughput and the PRB usage of a second frequency band is less than or equal to a preset second value, turning off at least one second cell of the second frequency band.

19. A non-transitory computer-readable recording medium having recorded thereon a program for generating representative data for training a base station model that, when executed by at least one processor of a device, causes the device to:
divide base station data into a plurality of pieces of base station data according to a first time unit;
generate first data of the first time unit by superimposing the plurality of pieces of base station data on each other;
divide the first data of the first time unit into a plurality of second time intervals, according to a second time interval unit;
calculate at least one probability density function for each second time interval of the plurality of second time intervals;
generate at least one first representative data by using respective probability density functions of the plurality of second time intervals; and
train the base station model, based on the at least one first representative data.

20. The non-transitory computer-readable recording medium of claim 19, wherein the program, when executed by the at least one processor, further cause the device to:
generate a histogram for each second time interval of the plurality of second time intervals by randomly sampling the first data of the first time unit;
calculate a probability density function for each second time interval of the plurality of second time intervals based on a corresponding histogram of each second time interval of the plurality of second time intervals;
generate at least one second representative data for each second time interval of the plurality of second time intervals by using a corresponding probability density function of each second time interval of the plurality of second time intervals; and
generate the at least one first representative data by connecting the at least one second representative data of each second time interval of the plurality of second time intervals to each other, according to the plurality of second time intervals.

\* \* \* \* \*